United States Patent
Frid

(10) Patent No.: US 10,581,709 B2
(45) Date of Patent: Mar. 3, 2020

(54) SYSTEM AND METHOD FOR SOFT FAILOVERS FOR PROXY SERVERS

(71) Applicant: Verint Systems Ltd., Herzliya Pituach (IL)

(72) Inventor: Naomi Frid, Modi'in (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 311 days.

(21) Appl. No.: 15/334,415

(22) Filed: Oct. 26, 2016

(65) Prior Publication Data

US 2017/0126797 A1 May 4, 2017

(30) Foreign Application Priority Data

Oct. 29, 2015 (IL) .......................................... 242353

(51) Int. Cl.
*H04L 12/26* (2006.01)
*H04L 29/14* (2006.01)
*H04L 29/08* (2006.01)

(52) U.S. Cl.
CPC .......... *H04L 43/0817* (2013.01); *H04L 43/10* (2013.01); *H04L 67/1034* (2013.01); *H04L 67/28* (2013.01); *H04L 69/40* (2013.01)

(58) Field of Classification Search
CPC .................................................. H04L 67/1027
See application file for complete search history.

(56) References Cited

U.S. PATENT DOCUMENTS

| | | | | | |
|---|---|---|---|---|---|
| 5,854,785 | A | * | 12/1998 | Willey | H04W 36/18 370/332 |
| 5,920,550 | A | * | 7/1999 | Willey | H04W 36/18 370/332 |
| 7,328,427 | B2 | * | 2/2008 | Pullara | G06F 8/61 709/220 |
| 7,379,419 | B2 | * | 5/2008 | Collins | G06F 8/60 370/217 |
| 7,508,772 | B1 | * | 3/2009 | Ward | H04L 45/02 370/254 |

(Continued)

OTHER PUBLICATIONS

Interface Masters Technologies, Inc., Niagara 2818 Product Family, Multi segment 10 Gigabit Intelligent Active Bypass, 2015, 2 pages.

(Continued)

*Primary Examiner* — Jimmy H Tran
(74) *Attorney, Agent, or Firm* — Meunier Carlin & Curfman LLC

(57) ABSTRACT

A packet broker that performs a health-status check of a proxy server while the proxy server processes one or more proxy connections. The packet broker may attempt to exchange a heartbeat signal with the proxy server, and if unsuccessful, the proxy server is assumed to be failing. In such cases, a failover is desirable. Rather than implementing a "hard" failover, in which no further communication packets are directed to the proxy server, a "soft" failover is performed where the packet broker prevents new proxy connections from being processed by the proxy server, but maintains at least one (e.g., all) of the current proxy connections that are being processed by the proxy server.

12 Claims, 2 Drawing Sheets

(56) References Cited

U.S. PATENT DOCUMENTS

| | | | | |
|---|---|---|---|---|
| 8,159,935 B1* | 4/2012 | Fritz | ................... | H04L 41/0663 370/220 |
| 8,250,166 B1* | 8/2012 | Barnes | ................ | G06F 11/2023 709/213 |
| 8,380,951 B1* | 2/2013 | Krinke, II | ........... | G06F 11/1458 711/161 |
| 8,856,583 B1* | 10/2014 | Visser | ................. | G06F 11/2094 714/4.11 |
| 10,027,531 B1* | 7/2018 | Fritz | ................... | H04L 41/0654 |
| 2004/0205190 A1* | 10/2004 | Chong | ............... | H04L 65/1043 709/225 |
| 2005/0036443 A1* | 2/2005 | Collins | ..................... | G06F 8/60 370/216 |
| 2007/0294563 A1* | 12/2007 | Bose | ................... | G06F 11/2092 714/5.11 |
| 2008/0092136 A1* | 4/2008 | Pullara | ...................... | G06F 8/61 717/174 |
| 2008/0285472 A1* | 11/2008 | Abdulla | .............. | G06F 11/2005 370/250 |
| 2008/0285552 A1* | 11/2008 | Abdulla | ............ | H04L 12/40013 370/389 |
| 2010/0077024 A1* | 3/2010 | Yun | ......................... | G06F 15/16 709/203 |
| 2012/0066363 A1* | 3/2012 | Somogyi | ........... | G06F 17/30286 709/223 |
| 2013/0279326 A1* | 10/2013 | Dunne | ................ | H04L 41/5025 370/228 |
| 2015/0063364 A1* | 3/2015 | Thakkar | .................. | H04L 12/66 370/401 |
| 2015/0195102 A1* | 7/2015 | Mochida | ............... | H04L 12/437 370/223 |

OTHER PUBLICATIONS

Ixia xStream™ 40, Aggregation, Filtering, and Load Balancing for 10G/40G Networks, Data Sheet, 2014, 5 pages.

Piper, S., "Network Packet Brokers for Dummies®," VSS Monitoring Special Edition, John Wiley & Sons, Inc., 2012, 75 pages.

* cited by examiner

SYSTEM AND METHOD FOR SOFT FAILOVERS FOR PROXY SERVERS

FIELD OF THE DISCLOSURE

The present disclosure relates to the management of proxy connections, and specifically, to failover in the event of a failed health status check of a proxy server.

BACKGROUND OF THE DISCLOSURE

A proxy server acts as an intermediary in an exchange of communication between a client computer and a server computer. The respective connections between the proxy server and the client and server are collectively referred to as a "proxy connection," and the proxy server is said to be processing the proxy connection. A proxy connection may be established, for example, for security-related monitoring, or for preventing access to certain websites.

SUMMARY OF THE DISCLOSURE

There is provided, in accordance with some embodiments described herein, apparatus for use with at least one proxy server processing at least one current proxy connection. The apparatus includes a digital memory, configured to store one or more packet identifiers, and proxy-managing circuitry. The proxy-managing circuitry is configured to (i) receive a plurality of communication packets, (ii) using the packet identifiers, identify those of the communication packets that belong to the current proxy connection, and (iii) perform a health-status check of the proxy server. In response to a failure in the health-status check of the proxy server, the proxy-managing circuitry maintains the current proxy connection, by directing to the proxy server those of the communication packets that belong to the current proxy connection, and prevents any new proxy connections from being processed by the proxy server, by not directing at least some of the communication packets to the proxy server.

In some embodiments, the apparatus includes a packet broker that includes the proxy-managing circuitry.

In some embodiments, the apparatus further includes a bypass switch, including:

a network interface, configured to receive the communication packets via a network; and bypass-switch circuitry, configured to direct the communication packets to the proxy-managing circuitry.

In some embodiments, the bypass-switch circuitry is further configured to:

perform a health-status check of the proxy-managing circuitry, and, in response to a failure in the health-status check of the proxy-managing circuitry, bypass the proxy-managing circuitry, by not directing communication packets received by the network interface to the proxy-managing circuitry.

In some embodiments, the packet identifiers include respective packet-identifier 5-tuples, respective headers of the communication packets include respective communication-packet 5-tuples, and the proxy-managing circuitry is configured to identify those of the communication packets that belong to the current proxy connection by attempting to match the communication-packet 5-tuples with the packet-identifier 5-tuples.

In some embodiments, the apparatus further includes the proxy server, and the proxy server is configured to fail the health-status check in response to receiving a shutdown command.

There is further provided, in accordance with some embodiments described herein, a method for use with at least one proxy server processing at least one current proxy connection. Using proxy-managing circuitry, a plurality of communication packets are received, and those of the communication packets that belong to the current proxy connection are identified. A health-status check of the proxy server is performed. In response to a failure in the health-status check of the proxy server, (i) the current proxy connection is maintained, by directing to the proxy server those of the communication packets that belong to the current proxy connection, and (ii) any new proxy connections are prevented from being processed by the proxy server, by not directing at least some of the communication packets to the proxy server.

In some embodiments, the method further includes:

performing a health-status check of the proxy-managing circuitry, and, in response to a failure in the health-status check of the proxy-managing circuitry, bypassing the proxy-managing circuitry, by not directing received communication packets to the proxy-managing circuitry.

In some embodiments, identifying those of the communication packets that belong to the current proxy connection includes identifying those of the communication packets that belong to the current proxy connection using one or more packet identifiers that are stored in a digital memory.

In some embodiments, the packet identifiers include respective packet-identifier 5-tuples, respective headers of the communication packets include respective communication-packet 5-tuples, and identifying those of the communication packets that belong to the current proxy connection includes identifying those of the communication packets that belong to the current proxy connection by attempting to match the communication-packet 5-tuples with the packet-identifier 5-tuples.

In some embodiments, the method further includes, using the proxy server, failing the health-status check in response to receiving a shutdown command.

There is further provided, in accordance with some embodiments described herein, a computer software product including a tangible non-transitory computer-readable medium in which program instructions are stored. The instructions, when read by a processor, cause the processor to (i) receive a plurality of communication packets, (ii) using a plurality of packet identifiers stored in a digital memory, identify those of the communication packets that belong to a current proxy connection of proxy server, (iii) perform a health-status check of the proxy server, and (iv) in response to a failure in the health-status check of the proxy server, (a) maintain the current proxy connection, by directing to the proxy server those of the communication packets that belong to the current proxy connection, and (b) prevent any new proxy connections from being processed by the proxy server, by not directing at least some of the communication packets to the proxy server.

In some embodiments, the packet identifiers include respective packet-identifier 5-tuples, respective headers of the communication packets include respective communication-packet 5-tuples, and the instructions cause the processor to identify those of the communication packets that belong to the current proxy connection by attempting to match the communication-packet 5-tuples with the packet-identifier 5-tuples.

The present disclosure will be more fully understood from the following detailed description of embodiments thereof, taken together with the drawings, in which:

DETAILED DESCRIPTION OF EMBODIMENTS

Overview

In embodiments that are described herein, a proxy-managing device referred to as a packet broker performs a health-status check of a proxy server while the proxy server processes one or more proxy connections. For example, the packet broker may attempt to exchange a heartbeat signal with the proxy server, one or more times. If none of the attempted exchanges are successful, the health-status check is assumed to have failed, and consequently, the proxy server is assumed to be unhealthy (i.e., failing), e.g., due to being overloaded. In such cases, a failover is desirable.

One option is to implement a "hard" failover, in which no further communication packets are directed to the proxy server until the proxy server is once again healthy. However, a disadvantage of such a hard failover is that current proxy connections are torn down.

Hence, some embodiments described herein implement a "soft" failover, in which the packet broker prevents new proxy connections from being processed by the proxy server, but maintains at least one (e.g., all) of the current proxy connections that are being processed by the proxy server.

System Description

Figure 1:
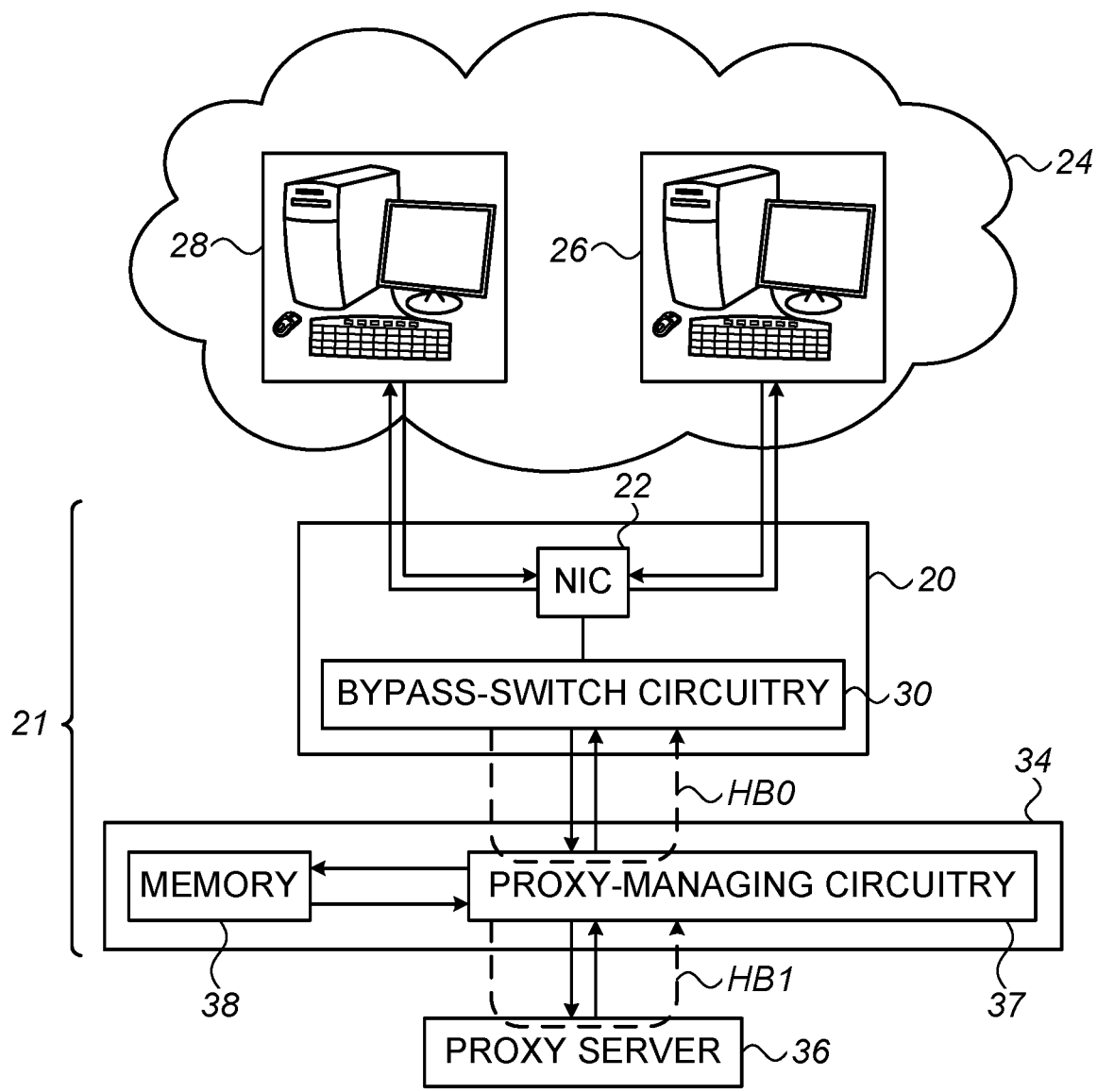
FIG. 1 is a schematic illustration of apparatus for use with at least one proxy server, in accordance with some embodiments described herein.

Reference is initially made to FIG. 1, which is a schematic illustration of apparatus 21 for use with at least one proxy server 36, in accordance with some embodiments that are described herein. Apparatus 21 comprises a packet broker 34 and/or any other suitable proxy-managing device, comprising proxy-managing circuitry 37. Although FIG. 1 shows a single proxy server, it is noted that apparatus 21 may be used to manage multiple proxy servers.

Apparatus 21 typically further comprises a bypass switch 20, comprising a network interface, such as a network interface card (NIC) 22, which receives communication packets that are exchanged over a network 24. For example, communication packets exchanged over network 24 between a client 26 and a server 28 may be received en route by NIC 22. These packets are passed to bypass-switch circuitry 30, which, under normal circumstances, directs the packets to packet broker 34. Packet broker 34 receives the communication packets from the bypass switch, and subsequently, under normal circumstances, directs the communication packets to proxy server 36. Upon receiving a communication packet, the proxy server, which typically may process more than one current proxy connection, identifies the proxy connection to which the packet belongs, and processes the packet as appropriate. The packet is then passed back to the packet broker, then back to the bypass switch, and finally, to the destination in the network.

The proxying that is performed by proxy server 36 may be performed under any suitable communication protocol, including Transmission Control Protocol (TCP) proxying, Hypertext Transfer Protocol (HTTP) proxying, and/or Secure Sockets Layer (SSL) proxying.

The packet broker continually (e.g., periodically) performs health-status checks of the proxy server, such as by attempting to exchange heartbeat signals HB1 with the proxy server. If, as is generally the case under normal circumstances, the health-status check is successful (e.g., signal HB1 is returned by the proxy server to the packet broker), the packet broker continues to direct communication packets to the proxy server, as described above. On the other hand, if the health-status check is unsuccessful (e.g., one or more attempted exchanges of heartbeat signals fail), the packet broker implements a soft failover. In such a failover, the packet broker prevents any new proxy connections from being processed by the proxy server, by not directing at least some of the received communication packets to the proxy server. Nevertheless, as noted above, the packet broker maintains at least one (e.g., all) of the current proxy connections, by directing to the proxy server those of the communication packets that belong to the at least one of the current proxy connections.

In typical embodiments, bypass-switch circuitry 30 continually (e.g., periodically) performs health-status checks of the proxy-managing circuitry, such as by attempting to exchange heartbeat signals HB0 with the proxy-managing circuitry. In response to a failed health-status check, the bypass-switch circuitry bypasses the proxy-managing circuitry, by not directing communication packets received at the network interface to the proxy-managing circuitry. In other words, the bypass switch implements a hard failover, in which the bypass-switch circuitry effectively functions as a "short circuit," by immediately passing the received communication packets back to NIC 22, which then transmits the packets to their respective destinations in the network, without first sending the packets to the proxy server.

Typically, the packet broker further comprises a digital memory 38, in which proxy-managing circuitry 37 stores one or more packet identifiers. For example, the proxy-managing circuitry may store all of the identifiers that are associated with the proxy server's current proxy connections. The stored packet identifiers are then used to identify those of the communication packets that belong to a current proxy connection, thus facilitating the above-described soft failover. For example, upon receiving a communication packet in failover mode, the proxy-managing circuitry may direct the received packet to the proxy server, only if the identifier of the received packet matches one of the stored identifiers.

In some embodiments, each of the packet identifiers includes a respective packet-identifier 5-tuple, which includes a source Internet Protocol (IP) address and port number, a destination IP address and port number, and a communication protocol. In such embodiments, the proxy-managing circuitry attempts to match the respective communication-packet 5-tuple that is included in the header of each received communication packet with the stored packet-identifier 5-tuples. A match with one of the packet-identifier 5-tuples indicates that the communication packet belongs to a current proxy connection.

In some embodiments, the proxy server is configured to fail the health-status check of the packet broker, even if the proxy server is healthy, in response to receiving a shutdown command. In other words, in response to receiving a shutdown command, the proxy server behaves as if it were unhealthy, by failing the health-status check. The packet broker then prevents new proxy connections from being processed by the proxy server, but maintains one or more of the current proxy connections, as described above. In this manner, a smoother shutdown is achieved, relative to if the proxy server were to simply tear down all current proxy connections by immediately shutting down.

The configuration of apparatus 21 shown in FIG. 1, and the internal configurations of packet broker 34 and bypass switch 20, are example configurations that are depicted purely for the sake of conceptual clarity. In alternative embodiments, any other suitable configurations may be used.

In some embodiments, the packet broker and bypass switch are implemented solely in hardware, e.g., using one or more Application-Specific Integrated Circuits (ASICs) or Field-Programmable Gate Arrays (FPGAs). In other embodiments, the packet broker and/or bypass switch is at least partly implemented in software. For example, in some embodiments, proxy-managing circuitry 37 and/or bypass-switch circuitry 30 is embodied as a processor comprising at least a central processing unit (CPU) and random access memory (RAM). Program code, including software programs, and/or data are loaded into the RAM for execution and processing by the CPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the proxy-managing processor, and/or bypass-switch processor, produce a machine or special-purpose computer, configured to perform the tasks described herein.

Figure 2A:
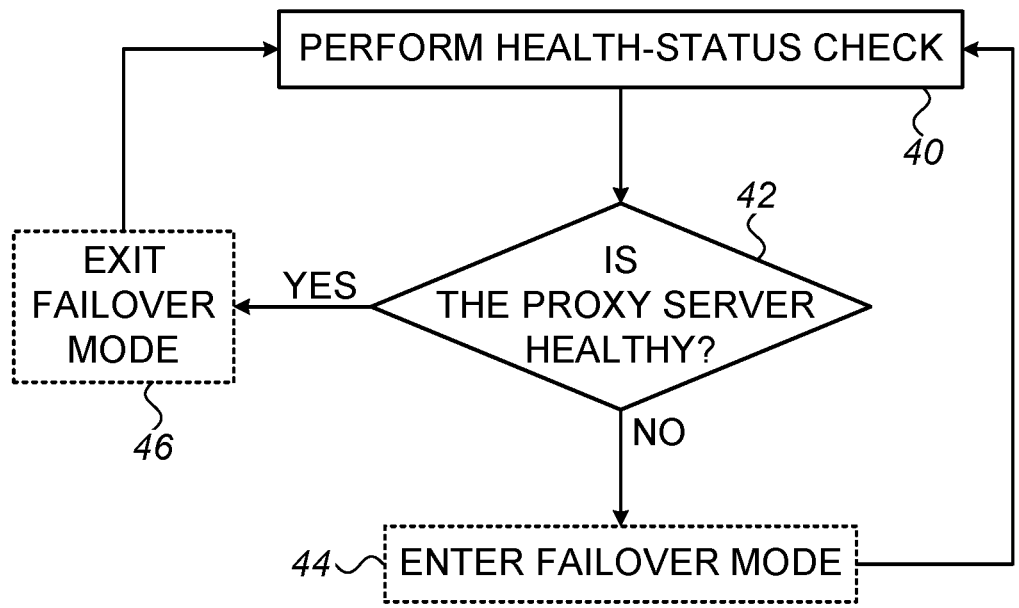
FIGS. 2A and 2B are flow diagrams for methods described herein, in accordance with some embodiments described herein.
Figure 2B:
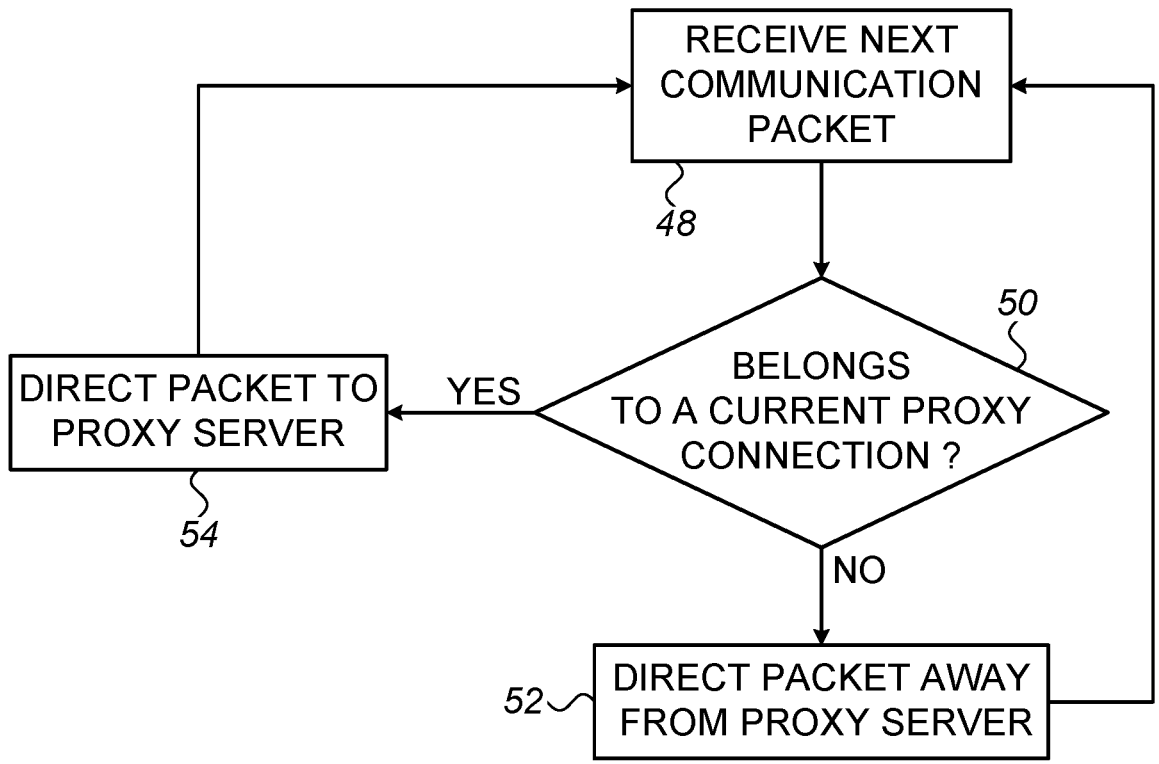

Reference is now made to FIGS. 2A-B, which are flow diagrams for methods described hereinabove, in accordance with some embodiments described herein.

FIG. 2A shows the method by which the packet broker determines whether to enter the failover mode described above, in which the packet broker prevents new proxy connections from being processed by the proxy server. At a checking step 40, the packet broker performs a health-status check of the proxy server, as described above. At a result-assessment step 42, the packet broker assesses the result of the health-status check, and thus determines if the proxy server is healthy. If the proxy server is healthy and the packet broker is currently in failover mode, the packet broker exits failover mode, at a failover-mode-exiting step 46. Conversely, if the proxy server is not healthy and the packet broker is currently not in failover mode, the packet broker enters failover mode, at a failover-mode-entering step 44. Subsequently, the packet broker continues to perform health-status checks, for continual monitoring of the proxy server.

FIG. 2B shows the performance of the packet broker in failover mode. At a receiving step 48, the packet broker receives the next communication packet, as described above. The packet broker then determines, at a decision step 50, whether the communication packet belongs to a current proxy connection, as described above. If yes, the packet broker directs the packet to the proxy server, at a packet-directing step 54. Otherwise, the packet broker directs the packet away from the proxy server, at an alternate packet-directing step 52. For example, the packet broker may direct the packet to another (healthy) proxy server, or back to the bypass switch. The packet broker then continues to receive subsequent communication packets.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus for use with at least one proxy server processing at least one current proxy connection between a client and a server in a network, the apparatus comprising:
   a packet broker comprising:
      a digital memory, configured to store one or more packet identifiers; and
      proxy-managing circuitry, configured to:
         receive a plurality of communication packets,
         using the packet identifiers, identify those of the communication packets that belong to the current proxy connection,
         perform a health-status check of the proxy server, and
         in response to a failure in the health-status check of the proxy server:
            maintain the current proxy connection, by directing to the proxy server those of the communication packets that belong to the current proxy connection, and
            prevent any new proxy connections from being processed by the proxy server, by not directing at least some of the communication packets to the proxy server; and
   a bypass switch in communication with the network and the packet broker, wherein the bypass switch is between the network and the packet broker.

2. The apparatus according to claim 1, the bypass switch comprising:
   a network interface, configured to receive the communication packets via a network; and
   bypass-switch circuitry, configured to direct the communication packets to the proxy-managing circuitry.

3. The apparatus according to claim 2, wherein the bypass-switch circuitry is further configured to:
   perform a health-status check of the proxy-managing circuitry, and,
   in response to a failure in the health-status check of the proxy-managing circuitry, bypass the proxy-managing circuitry, by not directing communication packets received by the network interface to the proxy-managing circuitry.

4. The apparatus according to claim 1,
   wherein the packet identifiers include respective packet-identifier 5-tuples,
   wherein respective headers of the communication packets include respective communication-packet 5-tuples, and wherein the proxy-managing circuitry is configured to identify those of the communication packets that belong to the current proxy connection by attempting to match the communication-packet 5-tuples with the packet-identifier 5-tuples.

5. The apparatus according to claim 1, further comprising the proxy server, wherein the proxy server is configured to fail the health-status check in response to receiving a shutdown command.

6. A method for use with at least one proxy server processing at least one current proxy connection between a client and a server in a network, the method comprising, using proxy-managing circuitry comprising a packet broker and a bypass switch:
receiving a plurality of communication packets at the bypass switch;
identifying those of the communication packets that belong to the current proxy connection;
performing a health-status check of the proxy server; and
in response to a failure in the health-status check of the proxy server:
maintaining the current proxy connection, by directing to the proxy server those of the communication packets that belong to the current proxy connection, and
preventing any new proxy connections from being processed by the proxy server, by not directing at least some of the communication packets to the proxy server.

7. The method according to claim 6, further comprising:
performing a health-status check of the proxy-managing circuitry, and
in response to a failure in the health-status check of the proxy-managing circuitry, bypassing the proxy-managing circuitry, by not directing received communication packets to the proxy-managing circuitry.

8. The method according to claim 6, wherein identifying those of the communication packets that belong to the current proxy connection comprises identifying those of the communication packets that belong to the current proxy connection using one or more packet identifiers that are stored in a digital memory.

9. The method according to claim 8,
wherein the packet identifiers include respective packet-identifier 5-tuples,
wherein respective headers of the communication packets include respective communication-packet 5-tuples, and
wherein identifying those of the communication packets that belong to the current proxy connection comprises identifying those of the communication packets that belong to the current proxy connection by attempting to match the communication-packet 5-tuples with the packet-identifier 5-tuples.

10. The method according to claim 6, further comprising, using the proxy server, failing the health-status check in response to receiving a shutdown command.

11. A computer software product comprising a tangible non-transitory computer-readable medium in which program instructions are stored, which instructions, when read by a processor, cause the processor to:
receive a plurality of communication packets between a client and a server in a network via a bypass switch, the bypass switch in communication with a broker having a digital memory,
using a plurality of packet identifiers stored in the digital memory, identify those of the communication packets that belong to a current proxy connection of a proxy server, perform a health-status check of the proxy server, and
in response to a failure in the health-status check of the proxy server:
maintain the current proxy connection, by directing to the proxy server those of the communication packets that belong to the current proxy connection, and
prevent any new proxy connections from being processed by the proxy server, by not directing at least some of the communication packets to the proxy server.

12. The computer software product according to claim 11,
wherein the packet identifiers include respective packet-identifier 5-tuples,
wherein respective headers of the communication packets include respective communication-packet 5-tuples, and
wherein the instructions cause the processor to identify those of the communication packets that belong to the current proxy connection by attempting to match the communication-packet 5-tuples with the packet-identifier 5-tuples.

* * * * *